United States Patent [19]

Taga et al.

[11] Patent Number: 4,787,272

[45] Date of Patent: * Nov. 29, 1988

[54] HYDRAULIC PRESSURE CONTROL APPARATUS FOR USE IN AUTOMATIC TRANSMISSION

[75] Inventors: Yutaka Taga, Aichi; Kunio Morisawa, Okazaki, both of Japan

[73] Assignee: Toyota Jidosha Kabushiki Kaisha, Toyota, Japan

[*] Notice: The portion of the term of this patent subsequent to Sep. 8, 2004 has been disclaimed.

[21] Appl. No.: 10,731

[22] Filed: Feb. 4, 1987

Related U.S. Application Data

[62] Division of Ser. No. 715,821, Mar. 25, 1985, Pat. No. 4,660,693.

[30] Foreign Application Priority Data

Apr. 4, 1984 [JP] Japan ................................. 60-65820
Jul. 13, 1984 [JP] Japan ............................... 60-144381

[51] Int. Cl.$^4$ ............................................. B60K 41/04
[52] U.S. Cl. ..................................................... 74/867
[58] Field of Search ........................... 74/867, 868, 869

[56] References Cited

U.S. PATENT DOCUMENTS

| | | | |
|---|---|---|---|
| 4,488,457 | 12/1984 | Nishimura et al. | 74/868 |
| 4,625,591 | 12/1986 | Nishikawa | 74/867 X |
| 4,660,693 | 4/1987 | Taga et al. | 192/0.075 |
| 4,691,594 | 9/1987 | Taga et al. | 74/869 |
| 4,719,822 | 1/1988 | Morisawa | 74/868 X |

*Primary Examiner*—Rodney H. Bonck
*Attorney, Agent, or Firm*—Oblon, Fisher, Spivak, McClelland & Maier

[57] ABSTRACT

In a hydraulic control system for a vehicle transmission including a first throttle valve for producing a first throttle pressure for boosting a line pressure valve and a second throttle valve for producing a second throttle pressure for shifting speed stages of the transmission, the spools of the first and the second throttle valve are boosted by the first and the second throttle pressure supplied thereto, respectively, so as to reduce the force required for the driver to bias the two spools in parallel by stepping down on the accelerator pedal; the first and the second throttle valve are further supplied with the first and the second throttle pressure, respectively, in the feedback manner so as to attenuate the increase of the first and the second throttle pressure produced thereby; and a cut-back valve is provided to allow the supply of the first throttle pressure to the first throttle valve for the line pressure boosting and for the feedback control only when the vehicle is running at above normal speed.

1 Claim, 11 Drawing Sheets

HYDRAULIC PRESSURE CONTROL APPARATUS FOR USE IN AUTOMATIC TRANSMISSION

This is a division, of application Ser. No. 715,821, filed Mar. 25, 1985 and now U.S. Pat. No. 4,660,693.

BACKGROUND OF THE INVENTION

1. Field of the Invention

This invention relates to a hydraulic pressure control apparatus for use in an automatic transmission for an automobile.

2. Description of the Prior Art

In the automatic transmission, a lock-up clutch is provided parallel to a fluid torque converter in a passage for transmitting the engine power so that the lock-up clutch is engaged at high vehicle speed to prevent the transmission loss due to the fluid torque converter. However, when the vehicle speed is reduced from high vehicle speed by utilizing an engine brake and the lock-up clutch is under the engaged condition in spite of the high vehicle speed, shocks occurring during deceleration are unfavorably increased and thus the lock-up clutch is desirably under the released condition in a low throttle position in which a throttle valve is almost fully closed in an intake path. Further, in a hydraulic pressure control apparatus, many desirable special controls other than the control of the lock-up clutch are provided for the low throttle position Also, in a prior hydraulic pressure control apparatus is provided only one throttle valve for producing the throttle pressure related to the intake throttle position and the common throttle pressure is used for the control pressure of a line pressure producing valve and a shift valve. However, since the throttle pressure characteristics for producing a proper line pressure are different from the throttle pressure characteristics for producing a proper speed change point, it is difficult to control properly both the line pressure and speed change point.

Thus, this applicant disclosed in the Japanese Patent Application No. Sho 59-289 (corresponding to U.S. application Ser. No. 689,305, now U.S. Pat. No. 4,691,594) a hydraulic pressure control apparatus in which two throttle valves having respectively individual throttle pressure characteristics are provided to control respectively the line pressure producing valve and the shift valve by separate throttle pressures so that the line pressure and the speed change point are to be both properly provided.

SUMMARY OF THE INVENTION

An object of the present invention is to provide a hydraulic pressure control apparatus for use in an automatic transmission which is advantageous when a special control is desired in a low throttle position.

A further object of the present invention is to provide a hydraulic pressure control apparatus for use in an automatic transmission which is to hold a lock-up clutch under the released condition in a low throttle position like in the engine brake.

A still further object of the present invention is to overcome a problem in that a pedalling force on an accelerator pedal is increased in a hydraulic pressure control apparatus for use in an automatic transmission which has individually throttle valves for controlling the line pressure and the speed change point.

The hydraulic pressure control apparatus for use in the automatic transmission according to the present invention comprises a control pressure producing valve for producing the control pressure when the throttle valve in an intake path has assumed a position below a predetermined one and a change-over valve for controlling the change-over of the hydraulic pressure by the control pressure in the control pressure producing valve.

Thus, the control pressure representing the low throttle position time period is prepared and the change-over valve which should carry out the special control in the low throttle position carries out the change-over of the hydraulic pressure in response to the control pressure so that various controls desired in the low throttle position are to be carried out.

Further, the hydraulic pressure control apparatus for use in the automatic transmission according to the present invention comprises a fluid torque converter provided in an engine power transmitting path of the automatic transmission, a lock-up clutch provided parallel to the fluid torque converter, a control pressure producing valve for producing the control pressure when the throttle valve in the intake path has a position below a predetermined one and a lock-up controlling valve for holding the lock-up clutch under the released condition when supplied with the control pressure from the control pressure producing valve The lock-up control valve receives the control pressure from the control pressure producing valve in the low throttle position to hold the lock-up clutch under the released condition. As a result, during deceleration utilizing the engine brake, shocks occurring are to be sufficiently restrained since the difference between the torque at the drive wheel side and torque at the engine side is compensated by the fluid torque converter.

In a preferred embodiment, the control pressure producing valve has a spool moved axially in relation to the throttle valve position in the intake path and an output port connected to an input port to produce the control pressure when the spool is in the position corresponding to at most a predetermined throttle position.

The hydraulic pressure control apparatus for use in the automatic transmission according to the present invention comprises a first throttle valve for producing a first throttle pressure used for the line pressure producing valve controlling pressure by receiving an urging force related to the intake throttle position and a second throttle valve for producing a second throttle pressure used for the shift valve controlling pressure by receiving the urging force related to the intake throttle position and the hydraulic pressure for providing an auxiliary force in the same direction as the urging force related to the intake throttle position supplying respectively to the first and second throttle valves.

As a result, the pedalling force is to be reduced since the auxiliary force is produced in the first and second throttle valves in the direction of aiding the pedalling force on the accelerator pedal.

In the preferred embodiment, a cut-back valve for receiving the governor pressure related to the vehicle speed and the first throttle pressure produced by the first throttle valve in opposition to each other to produce the cut-back pressure from the first throttle pressure is provided so that the cut-back pressure is used for the auxiliary pressure producing hydraulic pressure in the first throttle valve.

Preferably, the second throttle pressure is used for the auxiliary force producing hydraulic pressure in the second throttle valve.

The accompanying drawings, which are incorporated in and constitute part of this specification, illustrate an embodiment of the invention and, together with the description, serve to explain the principles of the invention.

BRIEF DESCRIPTION OF THE DRAWINGS

FIG. 1 is a view showing the principal parts of the present invention.

DESCRIPTION OF THE PREFERRED EMBODIMENTS

Figure 1:
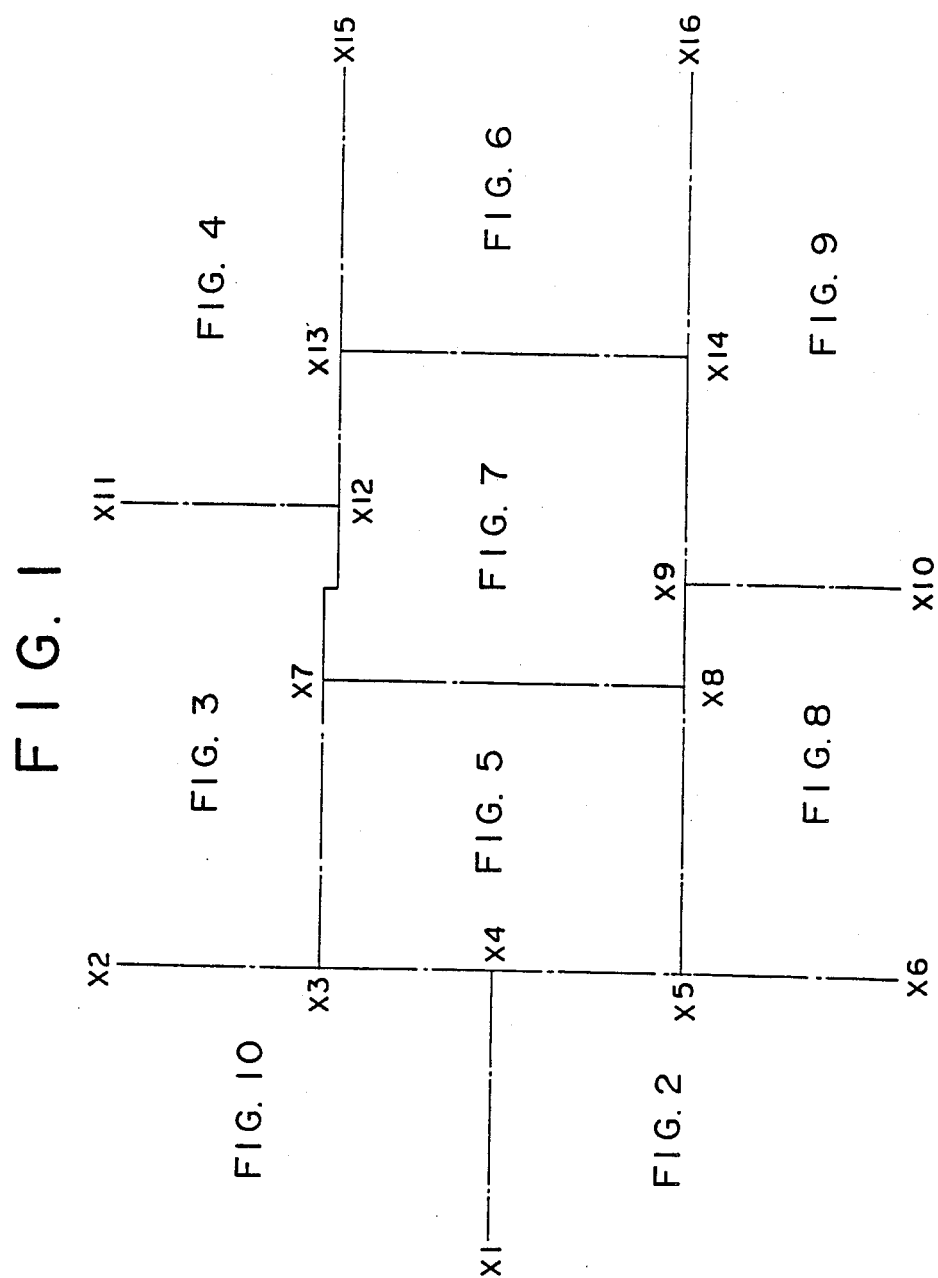
FIG. 1 is a view showing the division of a circuit diagram of the whole hydraulic pressure control.
Figure 2:
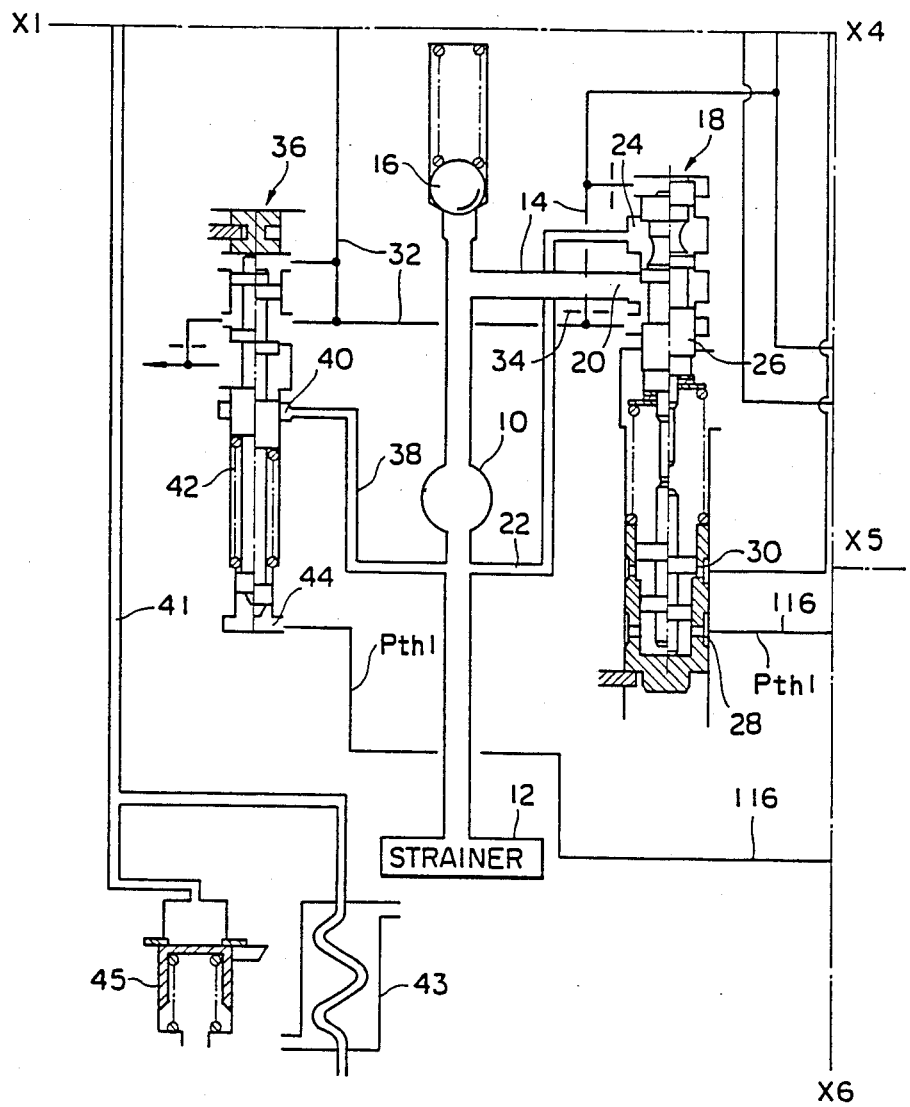
FIGS. 2 to 10 are fragmentary views corresponding to the respective divisions in FIG. 1.

FIG. 1 shows the division of the whole hydraulic pressure control circuit. In FIG. 2, an oil pump 10 driven by an engine pressurizes and discharges oil sucked through a strainer 12. A line pressure oil path 14 is connected to the discharge side of the oil pump 10 and a relief valve 16 regulates the upper limit of the line pressure Pl in the line pressure oil path 14. A primary regulator valve 18 has a port 20 connected to the line pressure oil path 14, a port 24 connected to the intake side of the oil pump 10 through an oil path 22 and a spool 26 for controlling the connection between the ports 20 and 24. A port 28 is supplied with the first throttle pressure Pthl which is a first increasing function of the throttle position in the intake path. As the first throttle pressure Pthl is increased, oil flowing out from the port 20 to the port 24 is decreased and the line pressure Pl becomes an increasing function of the first throttle pressure Pthl. A port 30 is supplied with the line pressure Pl from a manual valve in the R-range or 2-range and thereby the line pressure Pl in the port 20 during the R and 2-ranges is determined. An oil path 32 is connected to the line pressure oil path 14 through an orifice 34, and a secondary regulator valve 36 has a port 40 connected to the suction side of the oil pump 10 through an oil path 38, a spring 42 and a port 44 supplied with the first throttle pressure Pthl controls the hydraulic pressure in the oil path 32 by controlling the discharging flow of oil from the oil path 32 to the port 40 in relation to the spring 42 and the first throttle pressure Pthl. An oil path 41 is connected to an oil cooler 43 and a relief valve 45 restrains the upper limit of the hydraulic pressure in the oil path 41.

Figure 3:
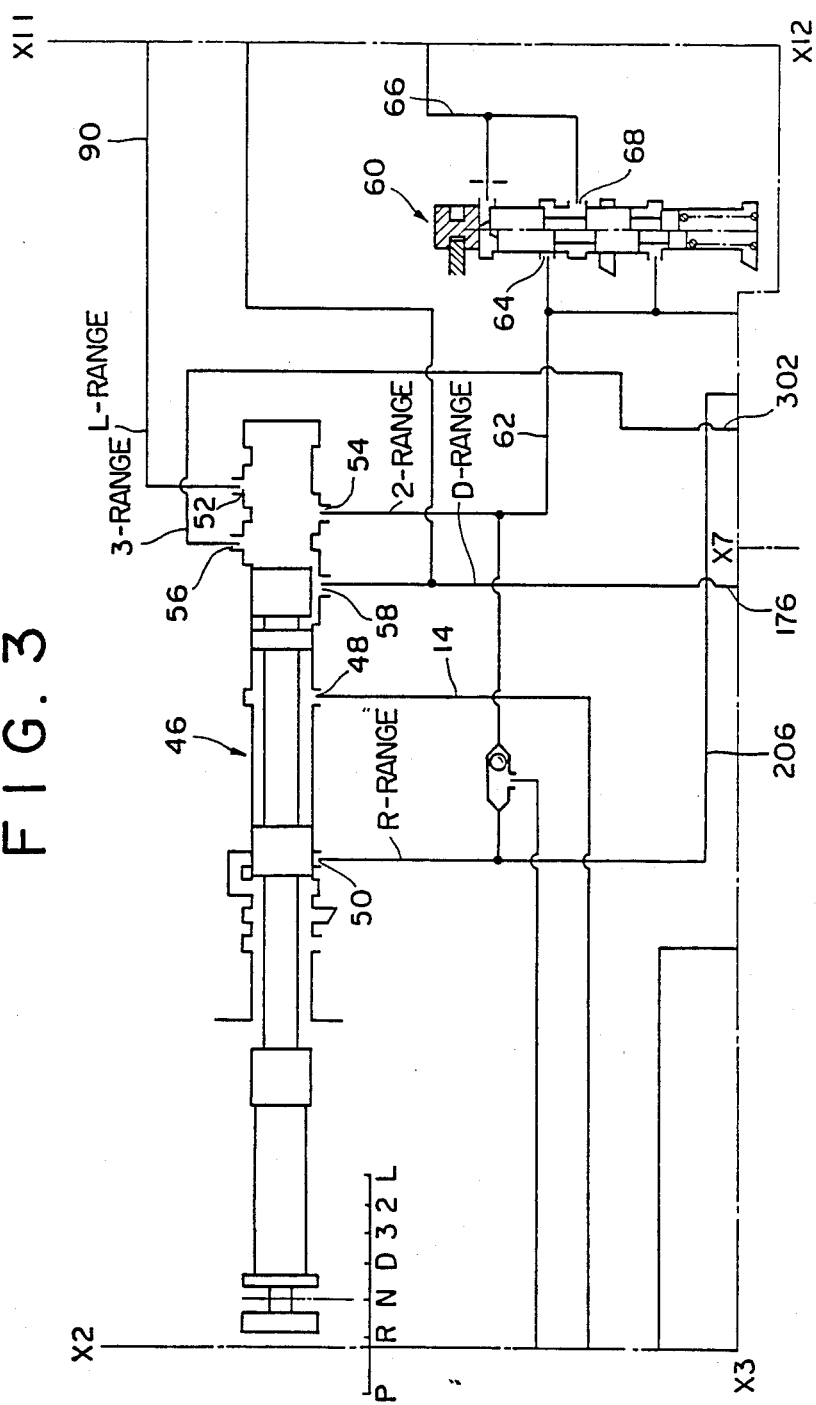

In FIG. 3, a manual valve 46 has an input port 48 connected to the oil path 14, an output port 50 connected to the input port 48 in the R-range, an output port 52 connected to the input port 48 in the L-range, an output port 54 connected to the input port 48 in the L, 2-ranges, an output port 56 connected to the input port 48 in the L, 2, 3-ranges and an output port 58 connected to the input port 48 in the L, 2, 3, D-ranges. A modulator valve 60 for the 2-range has an input port 64 connected to the port 54 through an oil path 62 and an output port 68 connected to an oil path 66 and produces the modulator pressure appropriately lower than the line pressure Pl in the output port 68.

Figure 4:
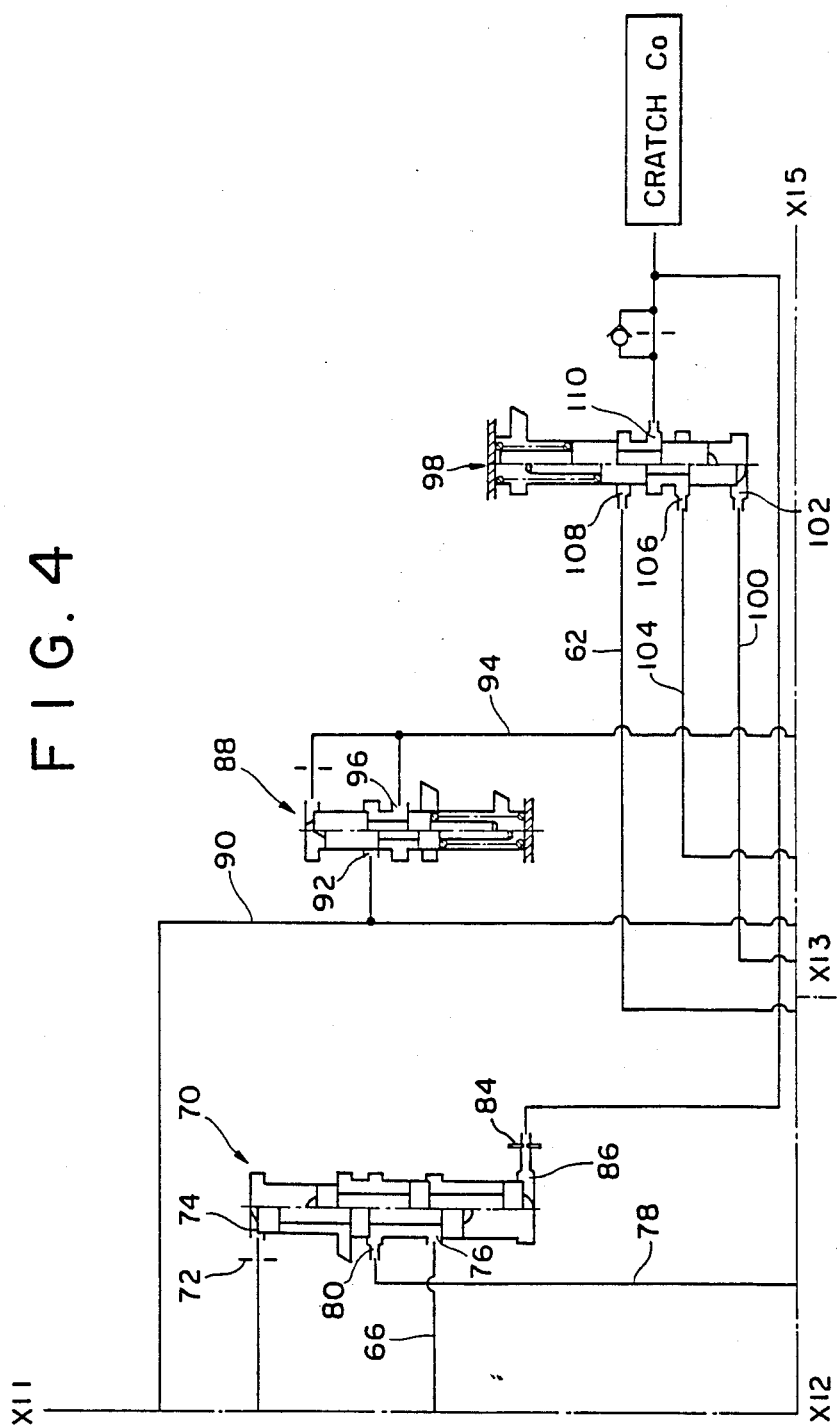

In FIG. 4, a D-2 timing valve 70 has a port 74 connected to the port 58 through an orifice 72 and supplied with the line pressure Pl in a period of the forward travelling range, an input port 76 connected to the oil path 66 and supplied with the modulator pressure in the modulator valve 60 in the L, 2-ranges, an output port 80 connected to the oil path 78 and a port 86 connected through an orifice 84 to a hydraulic pressure cylinder of a clutch Co and introduces the modulator pressure in the input port 76 to the output port 80 after the clutch Co is put into the engaged condition when the D-range is shifted to the L or 2-range. The oil path 78 is connected to a 2-3 shift valve which will be later described and is changed over from the high speed side position to the low speed side position by the modulator pressure from the oil path 78. Also since the clutch Co is one which is engaged to ensure first to third speed engine brakes, when the D-range is shifted to the L or 2-range, the third speed is held after the clutch Co is engaged until the vehicle speed is properly reduced to thereby prevent the fourth speed from being changed directly to the second speed. A modulator valve 88 for the L-range has an input port 92 connected to the port 52 through an oil path 90 and an output port 96 connected to an oil path 94 to produce a predetermined modulator pressure in the output port 96 in the L-range. A control valve 98 has a port 102 supplied with the line pressure Pl from the 2-3 shift valve through an oil path 100 when the 2-3 shift valve is in the low speed side position, a port 106 supplied with the line pressure Pl from the 3-4 shift valve through an oil path 104 when the 3-4 shift valve is in the low speed side position, a port 108 connected to the port 54 in the manual valve 46 through the oil path 62 and an output port 110 connected to a hydraulic pressure cylinder of the clutch Co. In the 3-range, the line pressure Pl is sent from the 3-4 shift valve to the port 106 and in the L, 2-ranges the line pressure Pl is sent from the manual valve 46 to the port 108. Hence, the line pressure Pl in the port 106 or 108 is introduced to an output port 110 in the 3, 2, L-ranges to put the clutch Co for an engine brake into the engaged condition.

Figure 5:
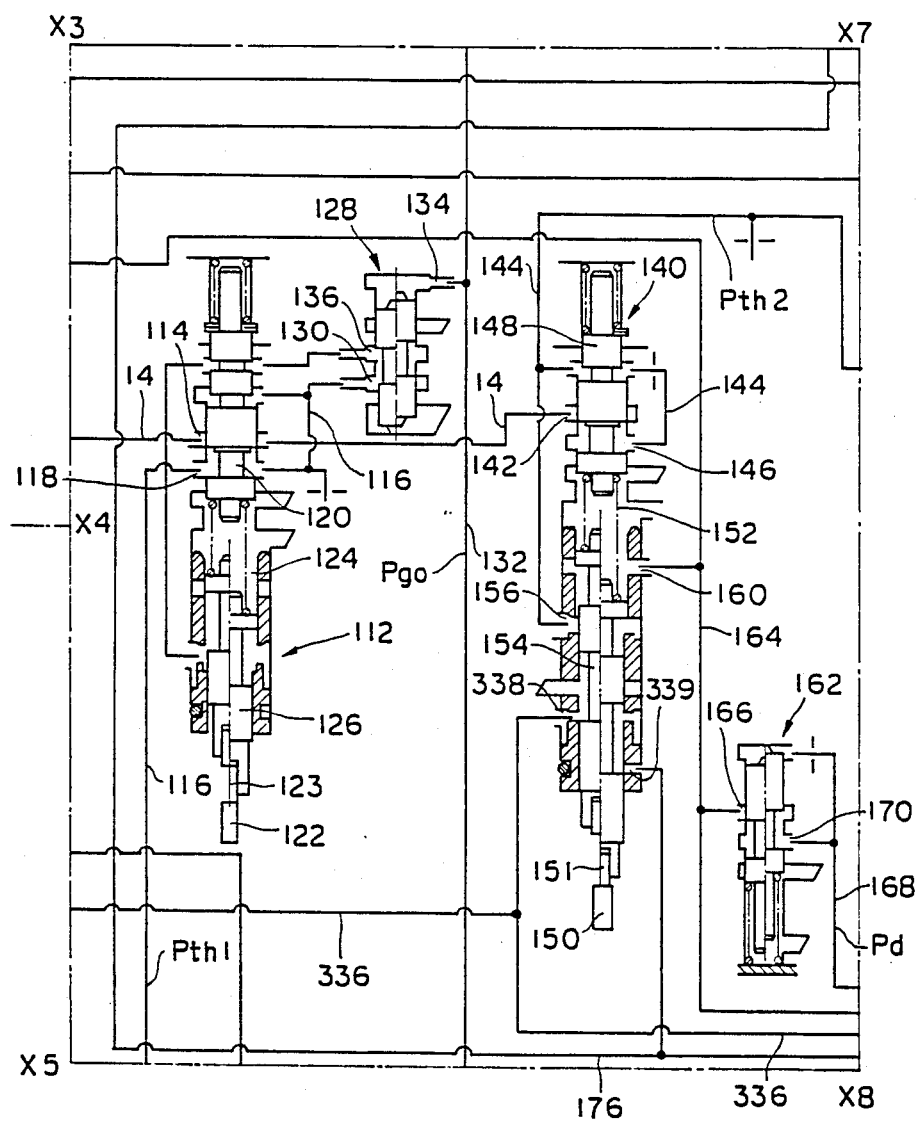

In FIG. 5, a first throttle valve 112 has an input port 114 connected to the line pressure oil path 14, an output port 118 connected to an oil path 116 to produce the first throttle pressure Pthl, a spool 120 for controlling the flow path area of the input port 114 to produce the throttle pressure Pthl corresponding to the working force of a spring 124, a throttle cam 122 interlocked with a throttle valve in the intake path and a spool 126 operated by the throttle cam 122 through a roller 123 to urge the spool 120 through the spring 124. Since the more the throttle valve position in the intake path is increased, the more the sectional area of flow in the input port 114 is increased, the first throttle pressure Pthl is the increasing function of the throttle position. A cut-back valve 128 has a port 130 supplied with the first throttle pressure Pthl, a port 134 supplied with the governor pressure Pgo through an oil path 132 and a port 136 for producing the control pressure for the first throttle valve 112 to limit properly the first throttle pressure Pthl with respect to the governor pressure Pgo and prevent the oil pump 10 from power loss. A second throttle valve 140 has an input port 142 connected to the line pressure oil path 14, an output port 146 connected to an oil path 144 to produce the second throttle pressure Pth2, a spool 148 for controlling the sectional area of flow path in the input port 142 to produce the throttle pressure Pth2 corresponding to the working force of a spring 152, a throttle cam 150 interlocked with the throttle valve in the intake path and a down-shift plug 154 operated by the throttle cam 150 through a roller 151 to urge the spool 148 through the spring 152. Since the more the throttle valve position in the intake path is increased, the more the sectional area of flow in the input port 142 is increased, the second throttle pressure Pth2 is the increasing function of the throttle position. When the throttle valve in the intake path is almost fully opened, i.e., in the kick-down, the down-shift plug 154 introduces the line pressure Pl from a port 156 to a port 160. A detent regulator valve 162 has an input port 166 connected to the port 160 through an oil path 164 to produce the predetermined detent pressure in an output port 170 connected to an oil path 168. When the throttle position reaches 85% or more, the down-shift plug 154 connects the oil path 144 to the port 160 to which the second throttle pressure Pth2 is introduced.

Figure 6:
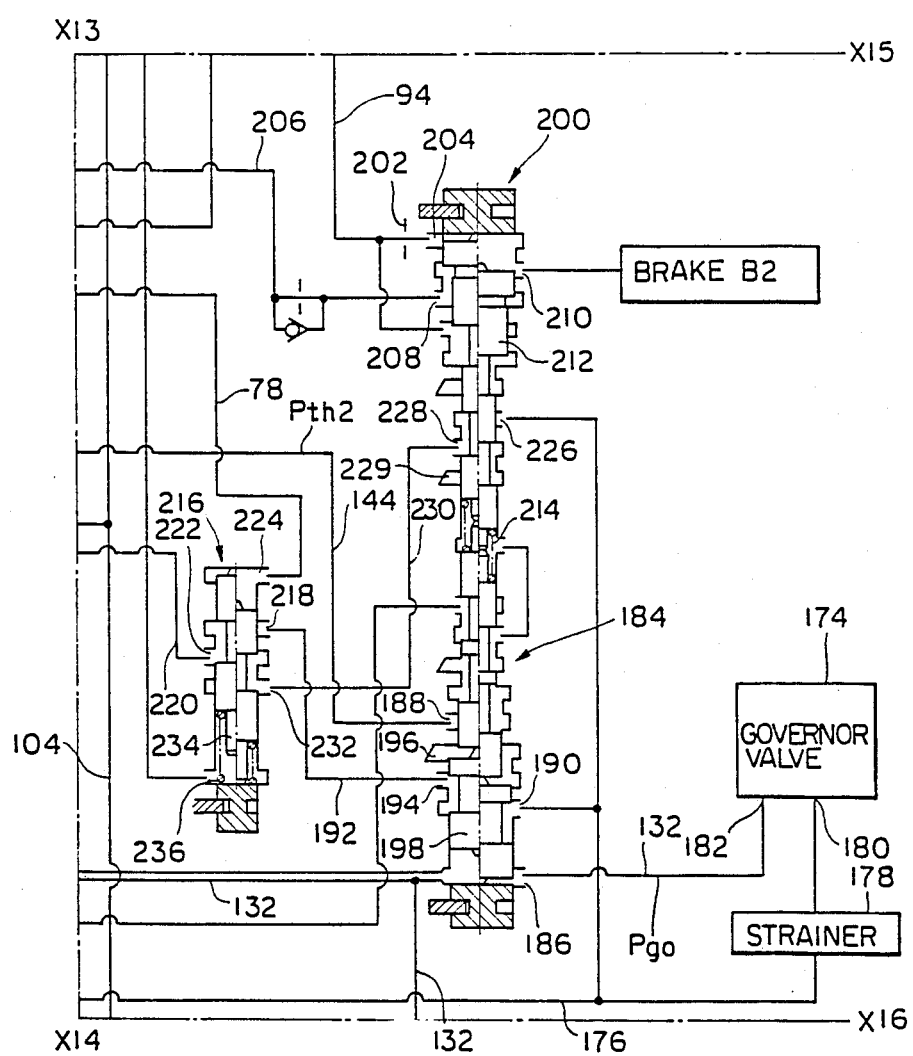

In FIG. 6, a governor valve 174 has an input port 180 supplied with the line pressure Pl through a strainer 178 from an oil path 176 connected to the port 58 of the manual valve 46 (the line pressure Pl is introduced to the port 58 in the forward travelling range) to produce the governor pressure Pgo related to the vehicle speed in an output port 182 connected to the oil path 132.

A 1-2 shift valve 184 has a port 186 supplied with the governor pressure Pgo through the oil path 132, a port 188 supplied with the second throttle pressure Pth2 through the oil path 144, an input port 190 connected to the oil path 176, an output port 194 connected to an oil path 192 and a spool 198 for selectively connecting the output port 194 to the input port 190 or a drain 196. The spool 198 interrupts the communication between the input port 190 and the output port 194 in the low speed side position, i.e., the first speed position to connect the output port 194 to the drain 196 and to the input port 190 in the high speed side position, i.e., at least the second speed position. A shift valve 200 for the L-range has an input port 204 connected to the oil path 94 through an orifice 202, an input port 208 connected through an oil path 206 to the port 50 in the manual valve 46(to which the line pressure Pl is introduced in the R-range), an output port 210 connected to a hydraulic pressure cylinder of a brake B2 engaged in the L and R ranges and a spool 212 for connecting the output port 210 to either the input port 208 or 210. As a result, in the L-range and the R-range the hydraulic pressure from the respective input ports 204, 208 is introduced through the output port 210 to the brake B2 to put the brake B2 into the engaged condition. In the L-range, the spool 212 moves toward the 1-2 shift valve 184 to hold the spool 190 in the 1-2 shift valve 184 at the low speed side position. Further, the first speed in the D-range is achieved by the engagement of a one-way clutch parallel to the brake B2 and the spool 212 receives a force directed from a spring 214 to the input port 204.

A second speed holding valve 216 has an input port 218 connected to the oil path 192, an output port 222 connected to an oil path 220, a port 224 connected to the oil path 78, an input port 232 connected to an oil path 230 supplied with the line pressure Pl in the oil path 176 (the oil path 176 is the line pressure Pl in the D, 3, 2, L-ranges and the spool 212 connects a port 226 to a port 228 in the D, 3, 2-ranges and a port 226 to a drain 229 in the L-range) through the ports 226, 228 of the L-range shift valve 184 and a spool 234 for connecting the output port 222 to the input port 218 or 232. The spool 234 is urged toward the port 224 by a spring 236 in the D, 3-ranges (that is, when the port 224 is free from the hydraulic pressure), and when the 1-2 shift valve 184 occupies the high speed side position, the line pressure Pl in the input port 218 is introduced to the output port 222. Also, the spool 234 in the 2-range is moved toward the spring 236 by the hydraulic pressure in the port 224 to introduce the line pressure Pl in the input port 218 to the output port 222. The oil path 220 is connected to a 2-3 shift valve which will be described later. The 2-3 shift valve in the 2-range is held at the low speed side position to introduce the line pressure Pl to the clutch Co and a brake B1 for the second speed, so that the 2-3 shift valve in the 2-range is held at the second speed by the second speed holding valve 216 and the spool 212 irrespective of the vehicle speed and the throttle position.

Figure 7:
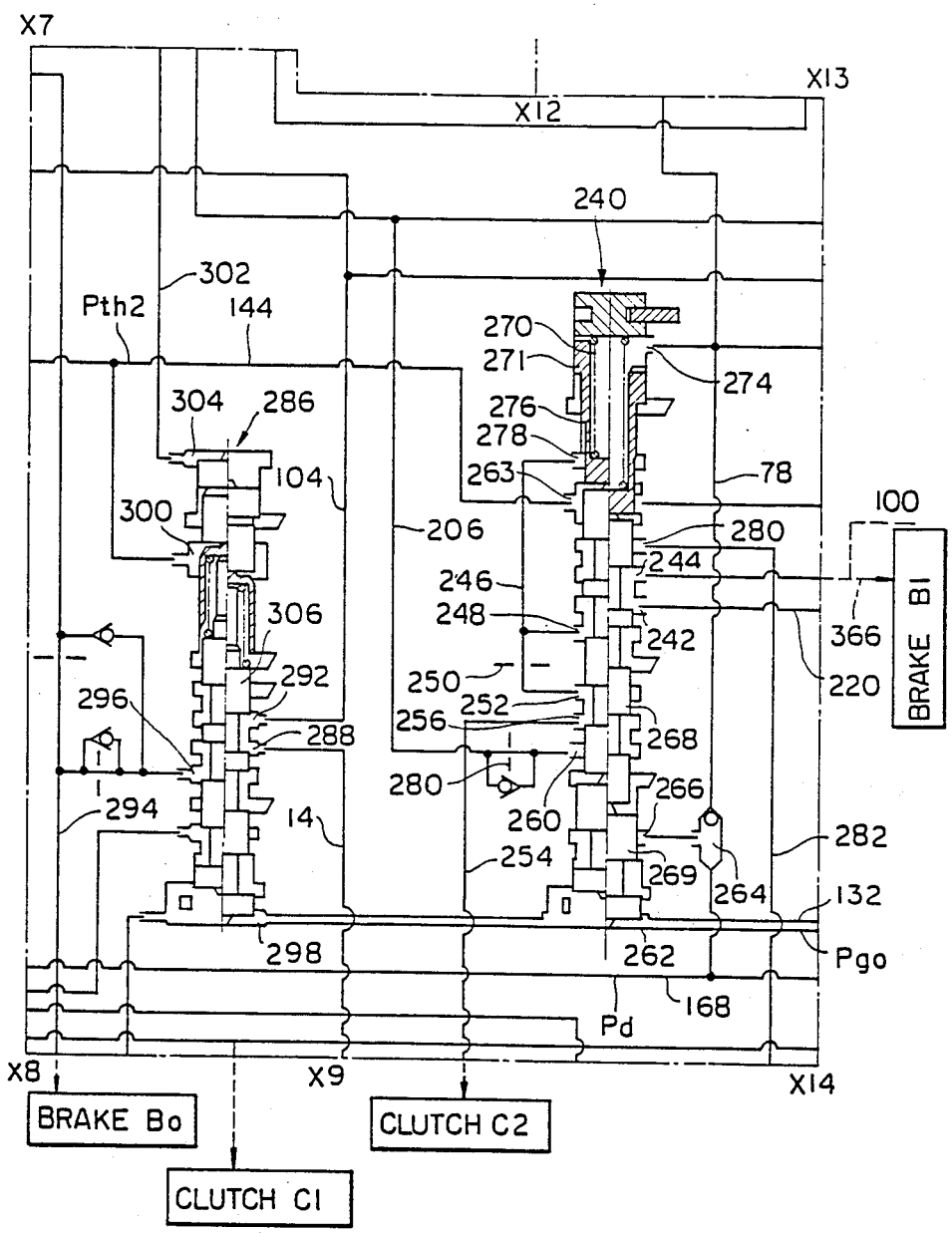

In FIG. 7, a 2-3 shift valve 240 has an input port 242 connected to the oil path 220, a low speed side output port 244 connected to the oil path 100, a high speed side output port 248 connected to an oil path 246, a port 252 connected to the oil path 246 through an orifice 250, a port 256 connected to an oil path 254 connected to a clutch C2 to be engaged in the third speed and fourth speed, a port 260 connected to the R-range port 50 of the manual valve 46 through the oil path 206, a port 262 connected to the oil path 132 to be supplied with the governor pressure Pgo, a port 263 supplied with the second throttle pressure Pth2 through the oil path 144, a port 266 supplied with the modulator pressure in the oil path 78 during the 2-range or the detent pressure Pd in the oil path 168 through a shuttle valve 264, a spool 268 for connecting the input port 242 to the output port 244 or 248, a spool 269 urged toward the spool 268 by the governor pressure Pgo in the port 262, a press member 271 pressed by a spring 270 toward the spool 268, a port 274 making the press member 271 exert the hydraulic pressure in the oil path 78 toward the spool 268 and a port 278 for exerting the hydraulic pressure in the oil path 246 to a step portion 276 of the press member 271 to urge the press member 271 in the opposite direction to the spring force of the spring 270.

When the second throttle pressure Pth2 is relatively large, compared to the governor pressure Pgo and the spool 268 is in the second speed position, the input port 242 is connected to the output port 244. As a result, the line pressure is sent to the hydraulic pressure cylinder of the second speed brake B1 to put the brake B1 into the engaged condition. Also, in this case, since the port 256 is connected to the port 260 and the oil path 206 is connected to the drain in the manual valve 46 during the D-range, the clutch C2 for the third speed and fourth speed is held in the released condition.

When the governor pressure Pgo is relatively large, compared to the second throttle pressure Pth2 and the spool 268 is in the third speed position, the input port 242 is connected to the output port 248 and the port 252 is connected to the port 256. As a result, the line pressure Pl is suplied to the clutch C2 for the third speed and fourth speed to put the clutch C2 into the engaged condition. The rate of supplying the line pressure Pl to the clutch C2 is controlled by the orifice 250 Also in this case, the output port 244 is connected to the drain of the 2-3 timing valve for the brake B1 through a port 280 and an oil path 282 to put the brake Bl for the second speed into the released condition.

Since the port 262 is free from the governor pressure Pgo in the R-range, the port 260 is connected to the port 256. Thus, the line pressure P( in the oil path 206 is supplied to the clutch C2 for the R-range through the ports 260, 256. The rate of supplying the line pressure Pl to the clutch C2 shifted to the R-range is regulated by an orifice 280 in front of the port 260.

A 3-4 shift valve 286 has an input port 288 connected to the oil path 176 supplied with the line pressure Pl in the D-range, a low speed side output port 292 connected to the oil path 104, a high speed side output port 296 connected to an oil path 294, a port 298 connected to the oil path 132 to be supplied with the governor pressure Pgo, a port 300 connected to the oil path 144 to be supplied with the second throttle pressure Pth2, a port 304 supplied with the line pressure Pl from the port 56 in the manual valve 46 through an oil path 302 in the 3-range and a spool 306 for connecting the input port 288 to the output port 292 or 296.

When the second throttle pressure Pth2 is relatively large, compared to the governor pressure Pgo and the spool 306 is in the low speed side position, the input port 288 is connected to the output port 292 and the line pressure Pl is introduced to the port 106 in the control valve 98 through the oil path 104. When the governor pressure Pgo is relatively large, as compared to the second throttle pressure Pth2 and the spool 306 is in the high speed side position, the input port 288 is connected to the output port 296 to put a fourth speed brake Bo into the engaged condition.

Figure 8:
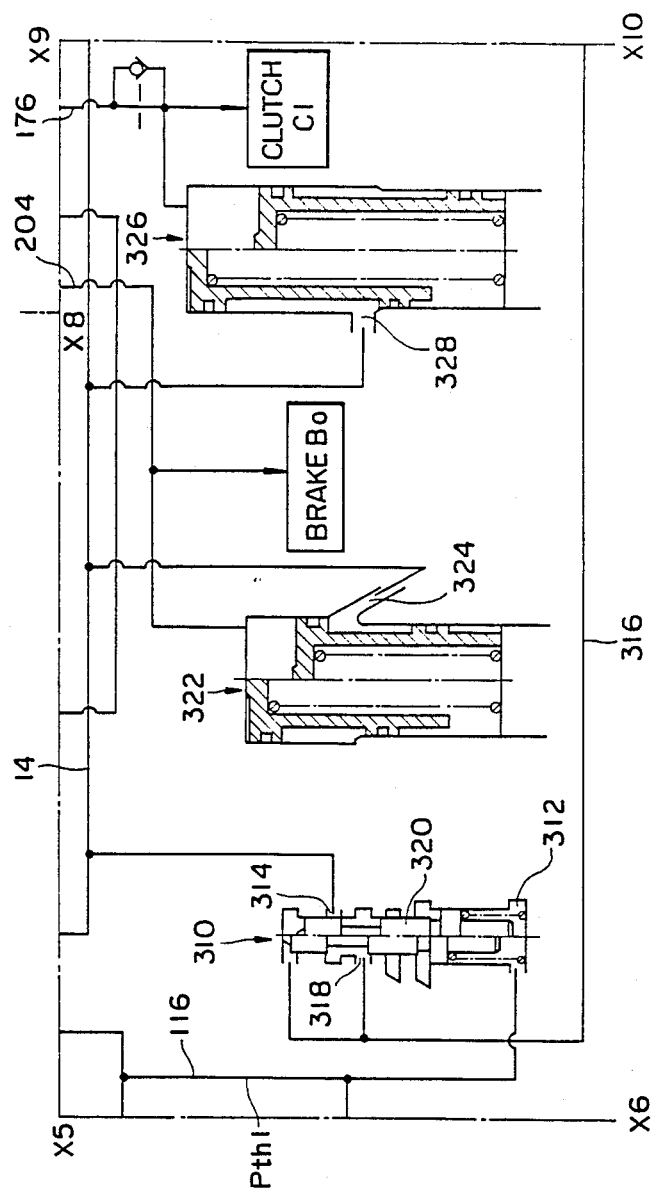

In FIG. 8, a controlling valve 310 for an accumulator has a port 312 connected to the oil path 116 to be supplied with the first throttle pressure Pth1, an input port 314 connected to the oil path 14 to be supplied with the line pressure Pl, an output port 318 connected to an oil path 316 and a spool 320 for controlling the sectional area of flow in the input port 314 and the output port 318 in relation to the second throttle pressure Pth2. The brake Bo is supplied with the line pressure Pl from the 3-4 shift valve 286 through the oil path 204. An accumulator 322 has a port 324 supplied with the line pressure Pl from the oil path 14 to control the rise and fall of the hydraulic pressure in the brake Bo. The clutch Cl is connected to the oil path 176 and an accumulator 326 has a port 328 supplied with the line pressure Pl from the oil path 14 to control the rise and fall of the hydraulic pressure in the clutch Cl.

Figure 9:
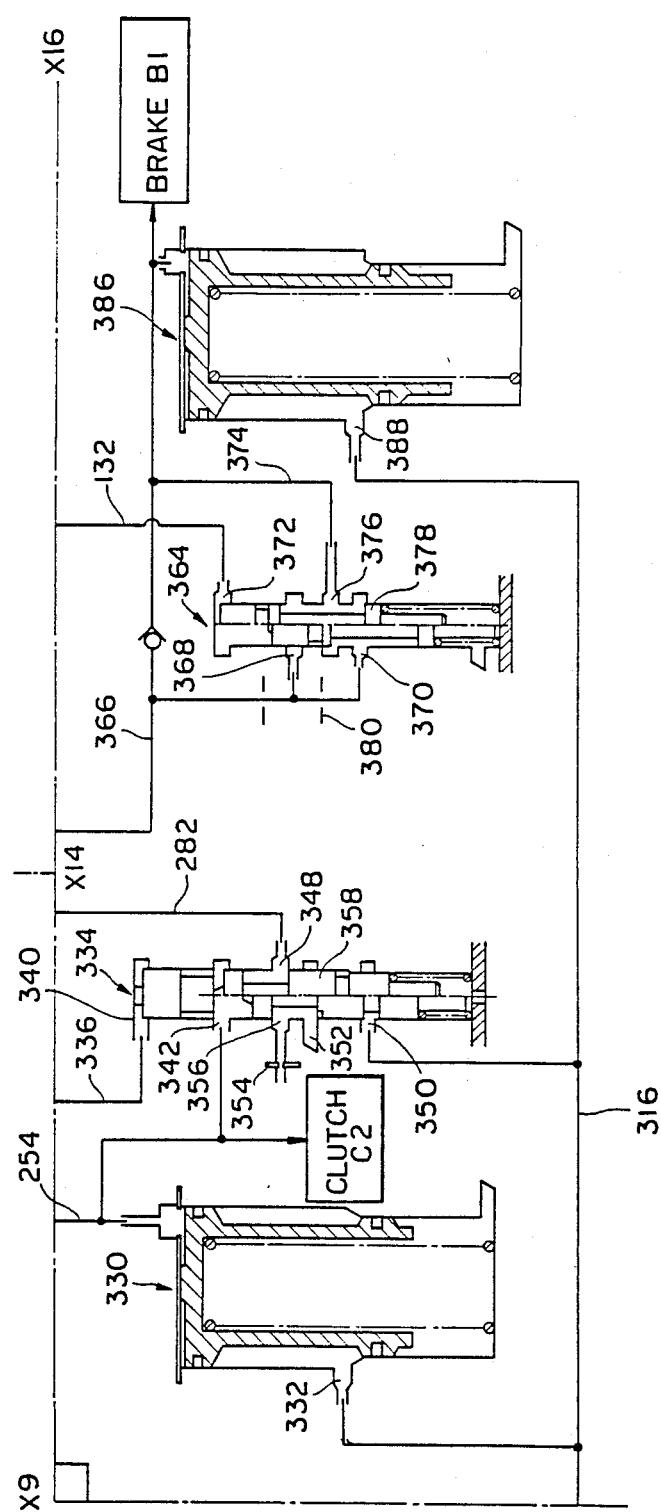

In FIG. 9, the clutch C2 is connected to the port 256 in the 2-3 shift valve 240 through the oil path 254 and an accumulator 330 has a port 332 supplied with the control pressure from the oil path 316 to control the rise and fall of the hydraulic pressure in the clutch C2.

A 2-3 timing valve 334 has a port 340 connected to a port 338 in the second throttle valve 140 through an oil path 336 (the line pressure P( in a port 339 is introduced to the port 338 in relation to the position of the plug 154), a port 342 connected to the oil path 254, a port 348 connected to the port 280 in the 2-3 shift valve 240 through the oil path 282, a port 350 connected to the oil path 316, a drain 352, a port 356 connected to the drain through an orifice 354 and a spool 358 for controlling the connection between the port 348 and the drain 352. In the shift-up from the second speed to the third speed, the port 348 is connected to the second speed brake Bl through the oil path 282 and the ports 280, 244 in the 2-3 shift valve 240. However, when the hydraulic pressure in the third speed clutch C2 is still low, the communication between the port 348 and the drain 352 is interrupted, and the oil in the brake Bl is discharged gently through the orifice 354. When the hydraulic pressure in the clutch C2 becomes sufficiently high, the port 348 is connected to the drain 352 so that the oil in the brake Bl is quickly discharged.

A 3-2 kick-down control valve 364 has ports 368, 370 connected to the port 244 in the 2-3 shift valve 240 through an oil path 366, a port 372 supplied with the governor pressure Pgo through the oil path 132, a port 376 connected to the brake Bl through an oil path 374 and a spool 378 for connecting the port 376 to the port 368 or 370. Since the governor pressure Pgo in the port 372 is low in the usual shift-down to the second speed, the line pressure Pl in the oil path 366 is sent quickly to the brake Bl through the ports 368, 376. However, in the shift-down to the second speed by the kick-down, when the governor pressure Pgo in the port 372 is high, the line pressure Pl is sent to the brake Bl through the ports 370, 376, i.e., through an orifice 380, so that the engagement of the brake Bl is delayed. As a result, direct shift-down from the fourth speed to the second speed is avoided and the shift-down to the second speed through the third speed is carried out.

An accumulator 386 has a port 388 connected to the oil path 316 to control the rise and fall of the hydraulic pressure in the brake Bl.

Figure 10:
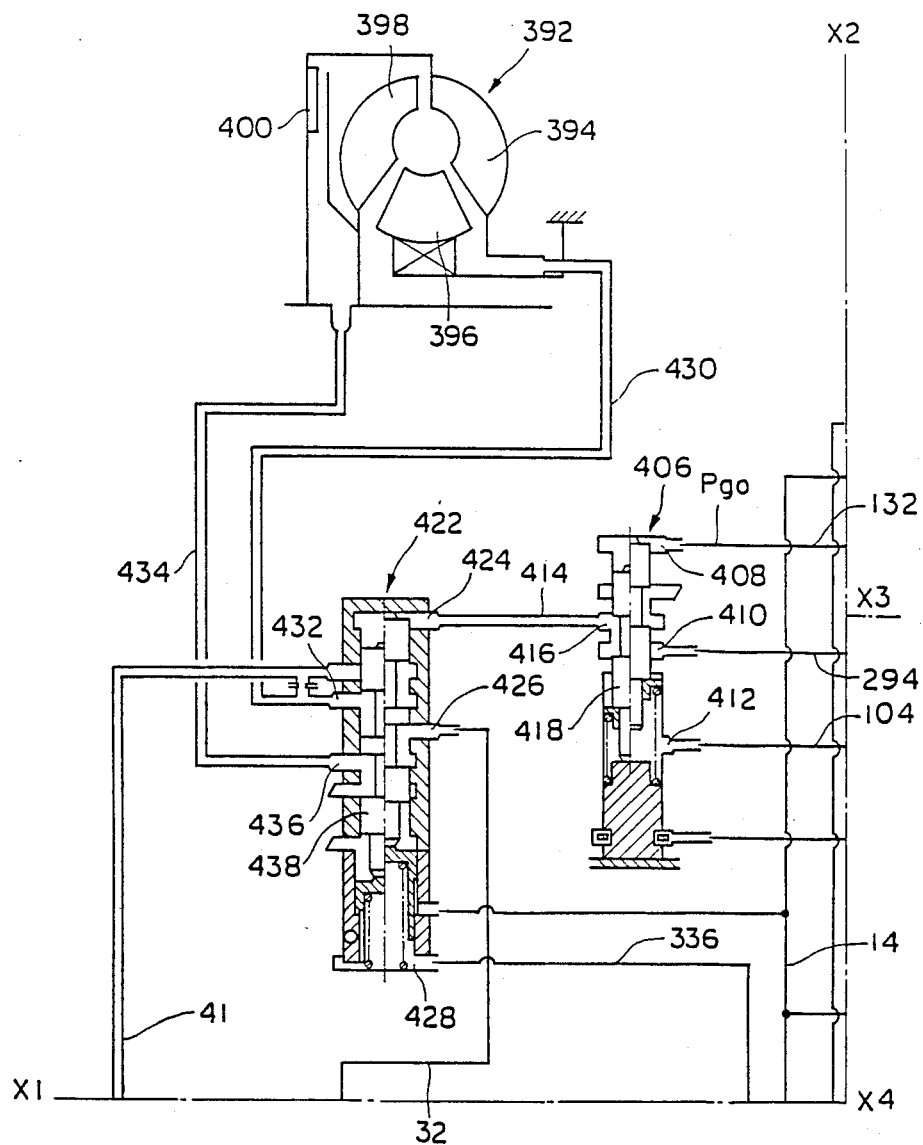

In FIG. 10, a fluid torque converter 392 for the automatic transmission has a pump impeller 394 connected to a crankshaft of the engine, a stator 396 and a turbine runner 398 coupled with an input shaft of a gear assembly. A lock-up clutch 400 is provided parallel to the fluid torque converter 392.

A lock-up signal valve 406 has a port 408 supplied with the governor pressure Pgo through the oil path 132, an input port 410 connected to the high speed side output port 296 in the 3-4 shift valve 286 through the oil path 294, a port 412 connected to the low speed side output port 292 in the 3-4 shift valve 286 through the oil path 104, a port 416 connected to an oil path 414 and a spool 418 for controlling the communication between the ports 410 and 416. When the 3-4 shift valve 286 is in the high speed side position and the governor pressure Pgo exceeds a predetermined value, the line pressure P( in the port 410 is introduced to the port 416.

A relay valve 422 has a port 424 connected to the oil path 414, an input port 426 connected to the oil path 32, a port 428 connected to the port 338 in the second throttle valve 140 through the oil path 336, a port 432 connected to the engaging side of the lock-up clutch 400 through an oil path 430, a port 436 connected to the releasing side of the lock-up clutch 400 through an oil path 434 and a spool 438 for connecting the port 426 to the port 432 or 436. When the hydraulic pressure is sent to the port 424, the port 426 is connected to the port 432 to put the lock-up clutch 400 into the engaged condition.

Again referring to FIG. 7, such will describe the principal parts of the embodiment.

When the automatic transmission is in the third speed, the line pressure Pl is sent to the port 242 through the oil path 220 and the line pressure Pl in the port 242 is supplied to the clutch C2 through the ports 248, 252, 256 and the oil path 254 to put the clutch C2 into the engaged condition. Also, the hydraulic pressure introduced into the port 278 through the oil path 246 acts on the step portion 276 of the press member 271 to separate the press member 271 from the spool 268 against the spring 270 and cancel the spring force of the spring 270.

When the shift-down from the third speed is carried out when the throttle valve in the intake path is almost fully closed, as mentioned above, since the spring force of the spring 270 is cancelled in the third speed condition, the governor pressure Pgo opposes to the sufficiently low second throttle pressure Pth2 in the port 263 in spite of the reduction of the vehicle speed and is maintained at the third speed until the vehicle speed is sufficiently reduced. When the vehicle speed is reduced further, the 1-2 shift valve 184 is changed over from the high speed side to the low speed side position before the 2-3 shift valve 240 comes to the low speed side position so that the line pressure Pl in the input port 242, thus in the port 278 disappears. As a result, since the press member 271 urges the spool 268 toward the port 262 by the spring force of the spring 270, the 2-3 shift valve 240 takes the low speed side position. Thus, when the second throttle pressure Pth2 is low, since the 2-3 shift valve 240 is changed over to the low speed side position after the 1-2 shift valve 184 is changed over to the low speed side position the shift-down from the third speed to the first speed without shifting to the second speed is carried out so that shocks accompanying the shift-down from the third speed to the second speed are prevented.

When the throttle valve position in the intake path is sufficiently large, the second throttle pressure Pth2 in the port 263 is sufficiently high. Although the spring force of the spring 270 is cancelled, the second throttle pressure Pth2 locates the 2-3 shift valve 240 at the low speed side position as the governor pressure Pgo in the port 262 is reduced, and the shift-down from the third speed to the second speed is carried out. In this case, since the output torque of the engine is sufficiently large, the drive torque will not become negative in the shift-down and no shock problems are encountered.

In the embodiment, the shift-down from the third speed to the first speed has been described, however, the present invention is to be applied to the shift-down from the fourth speed direct to the second speed without shifting to the third speed.

Now described are principal operations of the 2-3 shift valve 240 in FIG. 7.

In the third speed during the D-range, the spool 268 is in the third speed position to produce the line pressure Pl in the output port 248. This line pressure Pl acts on the step portion 276 through the control port 278 to reduce the downward force of the spool 268, i.e., force in the shift-down direction. In the large intake throttle position, the second throttle pressure Pth2 is also so large that the spool 268 is varied from the third speed position to the second speed position by the second throttle pressure Pth2 to produce the second speed as the governor pressure Pgo is reduced. In the small intake throttle position, however, the second throttle pressure Pth2 also becomes so small that the spool 268 is still held in the third speed position by the aid of the line pressure Pl in the step portion 276 even after the governor pressure Pgo is sufficiently reduced, and thus the third speed is maintained. Eventually, in the low throttle position, the 1-2 shift valve 184 is completely changed over from the second speed position to the first speed position before the 2-3 shift valve 240 is changed over from the third speed position to the second speed position, thereby the line pressure Pl in the input port 242, output port 248 and control port 278 in the 2-3 shift valve 240 disappears and the 2-3 shift valve 240 is changed over from the third speed position to the second speed position. That is, the shift-down from the third speed to the first speed is carried out without shifting to the second speed.

In the 2-range, the modulator pressure Pm2 is introduced to the control port 266 in the 2-3 shift valve 240 to oppose to the governor pressure Pgo in the port 262. When the governor pressure Pgo is thus reduced properly, the 2-3 shift valve is changed over from the third speed position to the second speed position by the modulator pressure Pm2 in the control port 266. After said valve is changed over to the second speed position, the working area of the land receiving the governor pressure Pgo is reduced so that the 2-3 shift valve 240 is held at the second speed position irrespective of the vehicle speed by the modulator pressure Pm2 in the control port 266.

In the change-over of the 2-3 shift valve 240 from the third speed to the second speed in the 2-range, since the line pressure Pl related to the intake throttle position acts on the step portion 276 the governor pressure Pgo in this change-over, thus the vehicle speed varies unfavorably in relation to the intake throttle position. Thus, according to the present invention, the modulator pressure Pm2 related to the in the throttle position is introduced to the control port 274 in the 2-3 shift valve 240 in the 2-range and this Pm2 acts on the end face of the spool 271 to counterbalance the line pressure Pl in the step portion 276 so that the vehicle speed in the change-over of the 2-3 shift valve 240 from the third speed pisition tothe second speed position in the 2-range is to be prevented from the change related to the intake throttle position.

Again referring to FIGS. 5, 9 and 10, now described are the principal parts of the embodiment.

The port 339 in the second throttle valve 140 is supplied with the line pressure Pl from the oil path 176 in the L, 2, 3, D-ranges. The down-shift plug 154 has the axial position controlled in relation to the rotation of the throttle cam 150 to be moved toward the spool 146 as the throttle position in the intake path is increased. When the throttle valve in the intake path has thus a low throttle position for example within 0–10% range, the port 338 is connected to the port 339, the line pressure Pl in the port 339 is supplied to the port 338.

The line pressure Pl in the port 338 is introduced to the port 428 in the relay valve 422 as a lock-up control valve through the oil path 336. Thus, the spool 438 is pressed against the port 424 irrespective of the pressure in the port 424 so that the port 426 is connected to the port 436. As a result, the oil in the port 426 flows through the port 436, the oil path 434, the release side of the lock-up clutch 400, the fluid torque converter 392, the oil path 430, the port 432 and the oil path 41 in the order mentioned. The lock-up clutch 400 is then released while the torque in the engine power transmitting path is transmitted through the fluid torque converter 392. Thus, the difference of the torque between the engine side and the drive wheel side while the engine brake is utilized to decelerate the vehicle and is compensated for by the fluid torque converter 392 to restrain shocks.

Also, since the oil path 336 is connected to the port 340 in the 2-3 timing valve 334, the spool 358 in the low throttle position is held in the lower side position shown in FIG. 9. Thus, since the port 348 is connected to the drain 352, when the 2-3 shift valve 240 is changed over from the low speed side position to the high speed side position, the oil in the brake Bl is discharged from the drain 352 through ports 244, 280,the oil 282 and the port 348 to release quickly the brake Bl. When the shift-up is carried out from the second speed to the third speed in the low throttle position, the engine output torque is so small that the release of the brake Bl for the second speed may be delayed so as to increase shocks in the speed change. However, the oil in the brake Bl is to be quickly discharged by the 2-3 timing valve 334 to prevent the release of the brake B1 from the delay for restraining the shocks.

Figure 11:
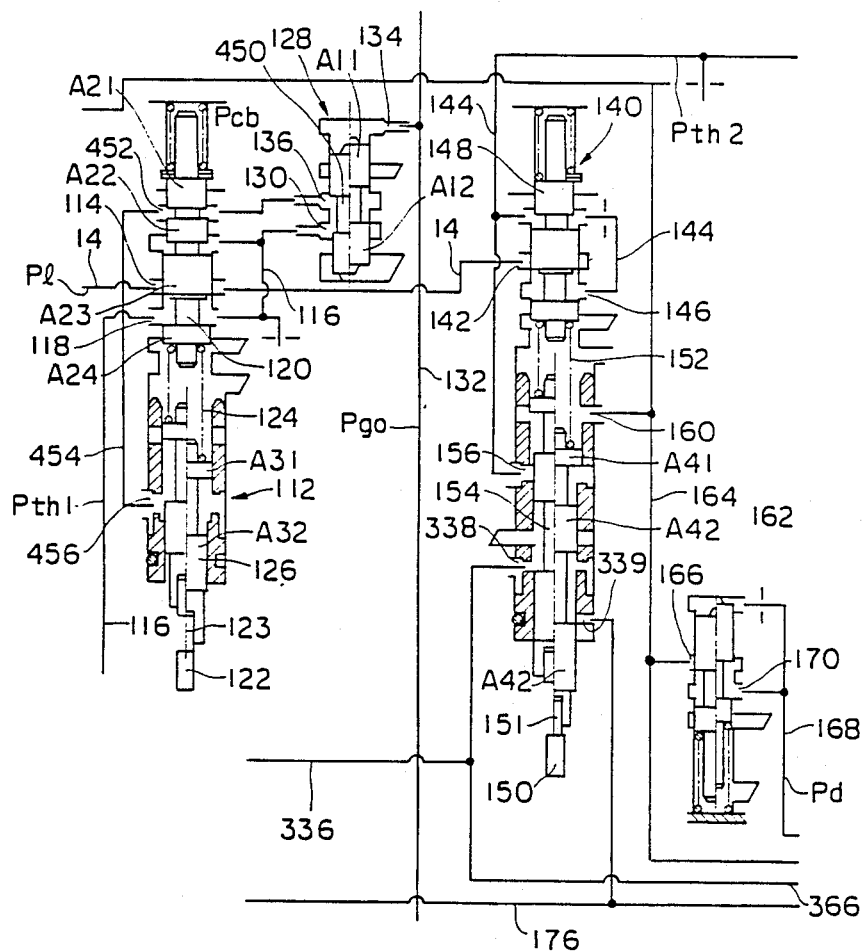

Next described will be principal parts of the present invention with reference to FIG. 11.

The cut-off valve 128 is supplied with the first throttle pressure Pth1 from the output port 118 in the first throttle valve 112 to the port 130 and has the port 134 supplied with the governor pressure Pgo from the governor valve 174 through the oil path 132 to control the connection between the ports 130, 136 through the spool 450 and produce the cut-back pressure Pcb in the port 136. Assuming the cross-sectional areas of lands of the spool 450 are respectively A11, A12 (provided A11>A12), the cut-back pressure Pcb is represented by the following formula;

in the case of $(A11-A12) \cdot Pth > A11 \cdot Pgo$: $Pcb = A11 \cdot Pgo/(A11-A12)$, in the case of $(A11-A12) \cdot Pth < A11 \cdot Pgo$: $Pcb = Pth$.

The cut-back pressure Pcb is introduced to the port 452 in the first throttle valve 112. The cross-sectional areas of four lands of the spool 114 are A21, A22, A23, A24 (provided A21<A22<A23<A24) in the order from the upper land in FIG. 11 and the cut-back pressure Pcb in the port 452 urges the spool 20 toward the spring 124, i.e., in the direction to reduce the first throttle pressure Pth1. Thus, the increase of the first throttle pressure Pth1 is to be properly restrained to reduce the power loss of the oil pump 10.

The port 452 communicates to the port 456 through the oil path 454. The cross-sectional areas of the two lands of the spool 126 are A31, A32 (provided A31>A32) from the upper land in FIG. 1 and thus the cut-back pressure Pcb in the port 456 urges the spool 126 toward the spring 124, i.e. in the direction opposite to the working force from the spring 24 to the spool 126. The throttle cam 122 is coupled to a throttle lever secured fixedly to a shaft of an intake throttle valve through a throttle cable to urge the spool 120 through the spool 123 and the spring 124 upward in FIG. 1, i.e., in the direction of increasing the first throttle pressure Pth1 as the pedalling amount of the accelerator pedal is increased. The port 456 is supplied with the cut-back pressure Pcb and the urging force due to this cut-back pressure Pcb aids the pedalling force on the accelerator pedal so that the pedalling force is to be reduced.

On the other hand, in the second throttle valve 140, the second throttle pressure Pth2 is produced in the output port 146 to be supplied to the port 156 in the down-shift plug 154 through the oil path 144. The cross-sectional areas of three lands of the down-shift plug 154 are A41, A42, A42 (provided A41>A42) from the upper land in FIG. 11 and the second throttle pressure Pth2 in the port 156 urges the down-shift plug 154 in the direction of the spring 152, i.e., in the direction opposite to the working force from the spring 152 to the down-shift plug 154. In the same manner as said throttle cam 122, the throttle cam 150 is coupled to the throttle lever through the throttle cable to urge the spool 148 through the down-shift plug 154 and the spring 152 upward in FIG. 11, i.e., in the direction of increasing the second throttle pressure Pth2 as the pedalling amount of the accelerator pedal is increased. Since the second throttle pressure Pth2 is supplied to the port 156 and the force urged by this second throttle pressure Pth2 aids the pedalling force on the accelerator pedal, the pedalling force is to be reduced.

Thus, forces for aiding the pedalling force on the accelerator pedal acts on the first and second throttle valves 112, 140 respectively, so that the increase of the pedalling force is to be avoided.

Further, in the kick-down, the input port 142 continuously communicates to the output port 146 in the second throttle valve 140 to provide Pth2=Pl, while the port 156 communicates to the port 160. Therefore, the second throttle pressure Pth2, thus the line pressure Pl, is produced in the port 160.

Also, when the intake throttle position is nil or approximately nil, the down-shift plug 154 affords communication between ports 338 and 339 so that the line pressure Pl from the oil path 176 is introduced to the port 338 through the port 339. As a result, the line pressure Pl is supplied to the port 428 in the relay valve 422 through the port 338 and the oil path 336 to place the relay valve 422 on the position where the lock-up clutch 400 is released. That is, when the intake throttle position is almost nil, the engagement of the lock-up clutch 400 is blocked so as to soften shocks in the drive system by the fluid torque converter 392.

It will be apparent to those skilled in the art that various modifications and variations may be made in the elements of the invention without departing from the scope or spirit of the invention.

What is claimed is:

1. A hydraulic pressure control apparatus for use in an automatic transmission, comprising:
   a first throttle valve for producing a first throttle pressure which increases in response to a first control force applied thereto in relation with intake throttle position, said first throttle pressure being for boosting a line pressure according to the intake throttle position;
   a second throttle valve for producing a second throttle pressure which increases in response to a second control force applied thereto in relation with the intake throttle position, said second throttle pressure being for shifting transmission speed stages;
   a first hydraulic system for supplying said first throttle pressure to said first throttle valve so as to lower said first throttle pressure to be produced thereby;
   a second hydraulic system for supplying said first throttle pressure to said first throttle valve for producing a first auxiliary force in said first throttle valve, said first auxiliary force being added to said first control force so as to operate in the same direction therewith;
   a third hydraulic system for supplying said second throttle pressure to said second throttle valve so as to lower said second throttle pressure to be produced thereby;
   a fourth hydraulic system for supplying said second throttle pressure to said second throttle valve for producing a second auxiliary force in said second throttle valve, said second auxiliary force being added to said second control force so as to operate in the same direction therewith; and
   a cut-back valve for controlling said supply of said first throttle pressure to said first throttle valve through said first and said second hydraulic system so as to allow said first throttle pressure to be supplied only when vehicle speed is above a predetermined low value.

* * * * *